United States Patent
Ishikura et al.

(10) Patent No.: US 9,793,608 B2
(45) Date of Patent: Oct. 17, 2017

(54) FERRITE COMPOSITION, FERRITE PLATE, MEMBER FOR ANTENNA ELEMENT, AND ANTENNA ELEMENT

(71) Applicant: TDK CORPORATION, Tokyo (JP)

(72) Inventors: Tomokazu Ishikura, Tokyo (JP); Shin Takane, Tokyo (JP); Norizumi Asano, Tokyo (JP); Kosuke Kunitsuka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 211 days.

(21) Appl. No.: 14/555,159

(22) Filed: Nov. 26, 2014

(65) Prior Publication Data
US 2015/0180128 A1 Jun. 25, 2015

(30) Foreign Application Priority Data
Dec. 20, 2013 (JP) .................. 2013-263283

(51) Int. Cl.
*H01Q 7/06* (2006.01)
*H01Q 7/08* (2006.01)
(Continued)

(52) U.S. Cl.
CPC ............ *H01Q 7/06* (2013.01); *C04B 35/26* (2013.01); *C04B 35/638* (2013.01);
(Continued)

(58) Field of Classification Search
CPC ........ H01Q 7/06; H01Q 1/222; H01Q 1/2225; G06K 19/07771; C04B 35/26; C04B 35/638; H01F 1/00; H01F 1/344
(Continued)

(56) References Cited

U.S. PATENT DOCUMENTS 5,597,512 A * 1/1997 Watanabe ................ B01J 13/00
106/287.34
5,764,198 A * 6/1998 Tsuru ....................... H01Q 1/38
343/702
(Continued)

FOREIGN PATENT DOCUMENTS

CN 1605576 A 4/2005
CN 103332928 A 10/2013
(Continued)

OTHER PUBLICATIONS

Aug. 6, 2015 Taiwanese Office Action issued in Taiwanese Application No. 103139809.
(Continued)

*Primary Examiner* — Tho G Phan
(74) *Attorney, Agent, or Firm* — Oliff PLC

(57) ABSTRACT

An object is to provide a ferrite composition suitable for an antenna element with a long communication distance in a high-frequency band (for example, 13.56 MHz), a ferrite plate formed of the ferrite composition, a magnetic member for an antenna element formed of the ferrite plate, and an antenna element provided with a member for an antenna element. A ferrite composition, wherein: main components contain, with $Fe_2O_3$ conversion, 45.0-49.5 mol % of iron oxide, with CuO conversion, 4.0-16.0 mol % of copper oxide, with ZnO conversion, 19.0-25.0 mol % of zinc oxide, a remaining portion is constituted by nickel oxide, an inevitable impurity is removed with respect to the main components, and as accessory components, with $TiO_2$ conversion, 0.5-2 weight % of titanium oxide, with CoO conversion, 0.35-2 weight % of cobalt oxide are contained.

16 Claims, 2 Drawing Sheets

(51) Int. Cl.
- *C02F 1/46* (2006.01)
- *H01Q 1/22* (2006.01)
- *H01F 1/34* (2006.01)
- *G06K 19/077* (2006.01)
- *C04B 35/26* (2006.01)
- *C04B 35/638* (2006.01)

(52) U.S. Cl.
CPC ....... *G06K 19/07771* (2013.01); *H01F 1/344* (2013.01); *H01Q 1/2225* (2013.01); *C04B 2235/3232* (2013.01); *C04B 2235/3277* (2013.01); *C04B 2235/3279* (2013.01); *C04B 2235/3281* (2013.01); *C04B 2235/3284* (2013.01); *C04B 2235/6562* (2013.01); *C04B 2235/72* (2013.01)

(58) Field of Classification Search
USPC .......... 343/787, 788; 252/62.59, 62.6, 62.62, 252/62.63
See application file for complete search history.

(56)  References Cited

U.S. PATENT DOCUMENTS

| 6,863,877 | B2* | 3/2005 | Walsdorff | B01J 23/745 423/150.1 |
| 8,031,127 | B2* | 10/2011 | Ochi | G06K 19/0723 343/700 MS |
| 8,125,401 | B2* | 2/2012 | Ito | G06K 19/07749 343/787 |
| 2005/0199851 | A1 | 9/2005 | Aoki et al. | |
| 2014/0035790 | A1* | 2/2014 | Chatani | H01Q 1/38 343/788 |

FOREIGN PATENT DOCUMENTS

| JP | A-2005-340759 | 12/2005 |
| JP | 2008-194865 A | 8/2008 |
| JP | A-2013-133263 | 7/2013 |
| JP | B2-5224495 | 7/2013 |
| KR | 10-2012-0057098 | 6/2012 |

OTHER PUBLICATIONS

Aug. 26, 2016 Office Action issued in Korean Patent Application No. 10-2014-0139622.

Jan. 14, 2016 Office Action issued in Korean Patent Application No. 10-2014-0139622.

* cited by examiner

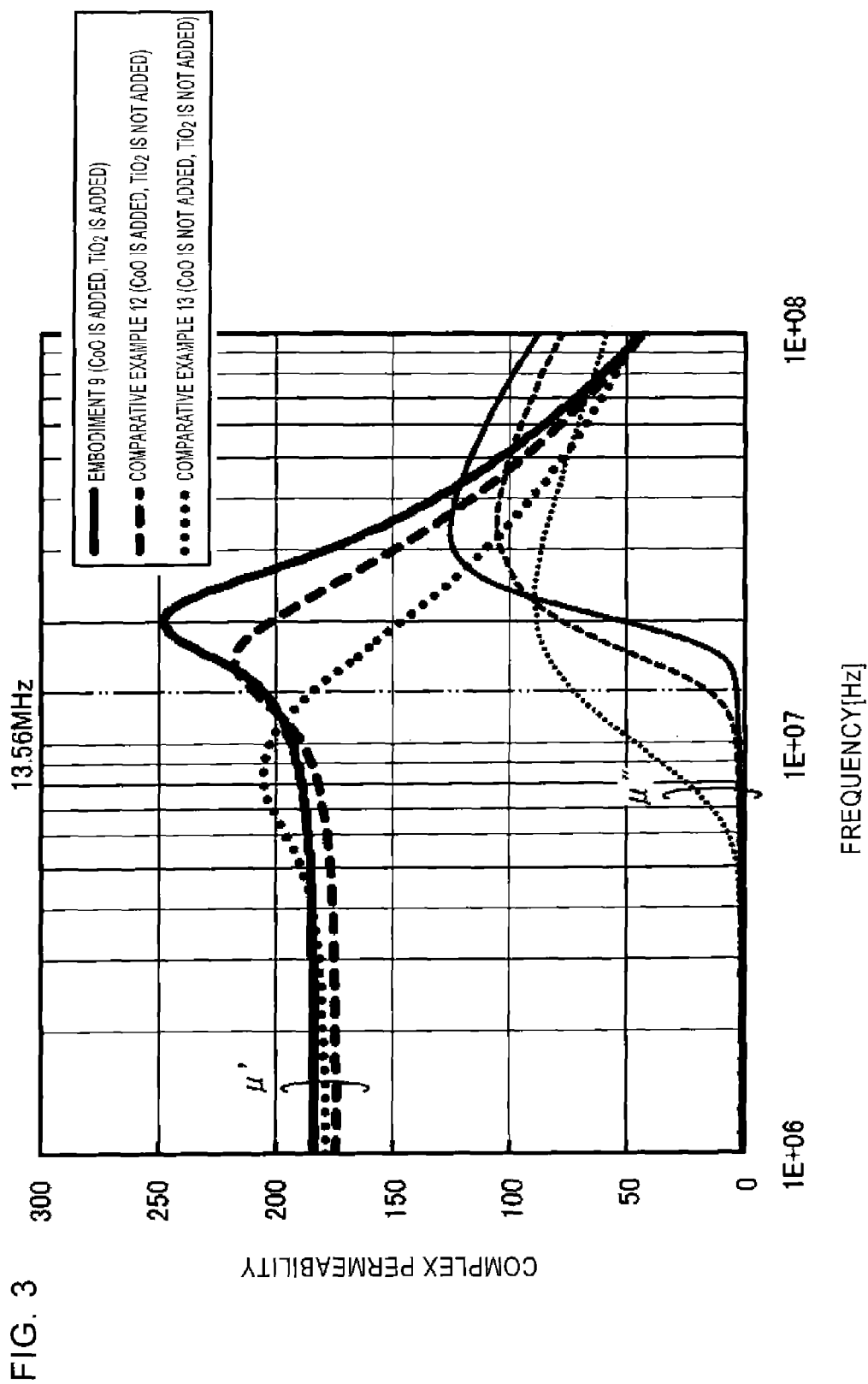

FERRITE COMPOSITION, FERRITE PLATE, MEMBER FOR ANTENNA ELEMENT, AND ANTENNA ELEMENT

TECHNICAL FIELD

This invention relates to a ferrite composition suitable for an antenna element with a long communication distance, a ferrite plate formed of the composition, a member for an antenna element formed of the ferrite plate, and an antenna element provided with any of these.

BACKGROUND TECHNOLOGY

A 13.56 MHz band RFID (Radio Frequency IDentification) system or NFC (Near Field Communication) system is a technology that performs non-contact short-distance wireless communication between (i) an IC card or an IC tag and (ii) a reader/writer. Such an IC card or IC tag is provided with an IC chip and an antenna coil, and an antenna coil is also provided in the reader/writer.

By making the IC card or the like close to the reader/writer, magnetic flux is generated by electromagnetic induction that is generated between these antenna coils. As the magnetic flux is exchanged between the IC card or the like and the reader/writer, power can be supplied, and information that has been written to the IC chip can be exchanged.

At that time, if metal such as a communication circuit or the like is integrally arranged at a rear surface or the like of an antenna coil within a casing, an eddy current is generated in the metal due to the generated magnetic flux, and this eddy current generates a magnetic field in a direction opposite to the generated magnetic flux. As a result, there will be problems such that the generated magnetic flux weakens, and a communication distance shortens, or communication cannot be performed. Additionally, thermal loss is also generated due to the generation of the eddy current.

To solve such problems, arrangement of a magnetic body is proposed, which is constituted by a material with high magnetic permeability between an antenna coil and metal. In general, magnetic permeability $\mu$ is expressed as complex magnetic permeability $\mu=\mu'-j\mu''$ (j is an imaginary unit). A real part $\mu'$ of complex magnetic permeability is a material constant showing a normal complex magnetic permeability component, and an imaginary part $\mu''$ is a material constant showing a loss. These material constants become factors that control a communication distance in short-distance wireless communication. In order to improve the communication distance, it is important to concentrate the magnetic flux by a high $\mu'$ while suppressing thermal loss by a low $\mu''$.

NiZn ferrite material has high resistivity, so a loss in a high-frequency band can be suppressed. NiZn ferrite material is often used as a magnetic body material for a high frequency. In particular, by including CoO, various techniques are implemented so as to improve a high-frequency characteristic. For example, in Patent Reference 1, a characteristic as a magnetic core member for an antenna module is improved by including CoO. Additionally, Patent Reference 2 discloses addition of cobalt ferrite ($CoFe_2O_4$) that is spinellized in advance so as to improve dispersiveness of Co. In Patent Reference 3, a selective reaction of CoO is controlled by adding $Co_2O_3$. However, such a high-frequency material is accompanied by deterioration of the real part $\mu'$ of complex magnetic permeability, and if such a material is mounted as an antenna element, there was a problem that a sufficient communication distance could not be obtained.

PRIOR ART TECHNOLOGY REFERENCES

Patent References

[Patent Reference 1] Japanese Published Patent Application 2005-340759
[Patent Reference 2] Japanese Patent Publication 5224495
[Patent Reference 3] Japanese Published Patent Application 2013-133263

SUMMARY OF THE INVENTION

Problem to be Resolved by the Invention

Upon considering these facts, an object of this invention is to provide a ferrite composition suitable for an antenna element with a long communication distance in a high-frequency band (for example, 13.56 MHz), a ferrite plate formed of the ferrite composition, a member for an antenna element formed of the ferrite plate, or an antenna element provided with the member for an antenna element.

Means for Solving the Problem

In order to solve the above-mentioned problems and accomplish the objects, in a ferrite composition related to this invention, main components contain, with $Fe_2O_3$ conversion, 45.0-49.5 mol % of iron oxide; with CuO conversion, 4-16.0 mol % of copper oxide; and with ZnO conversion, 19.0-25.0 mol % of zinc oxide. The remaining portion is constituted by nickel oxide, inevitable impurities are removed with respect to the main components, and as accessory components, with $TiO_2$ conversion, 0.5-2 weight % of titanium oxide; and with CoO conversion, 0.35-2 weight % of cobalt oxide are contained. In particular, by including $TiO_2$, the frequency dependency of $\mu''$ becomes steep; thus, $\mu''$ can be reduced while maintaining high $\mu'$ in RFID, or in the vicinity of 13.56 MHz that is an NFC communication frequency. Additionally, a communication distance can be improved by applying the ferrite plate formed of the ferrite composition related to this invention, or the member for an antenna element related to this invention, to an antenna element.

Effects of the Invention

According to this invention, in non-contact short-distance wireless communication between (i) an IC card or an IC tag provided with an antenna coil and (ii) a reader/writer, a ferrite composition suitable for an antenna element with a long communication distance can be obtained by setting the content of oxides constituting main components within the above ranges, and further including titanium oxide and cobalt oxide as accessory components within the above ranges.

BRIEF DESCRIPTION OF THE DRAWINGS

FIG. 3 is a graph, showing a frequency characteristic of complex magnetic permeability (i) when both $TiO_2$ and CoO are contained, (ii) when CoO is only contained, and (iii) when both $TiO_2$ and CoO are not contained, of a member for an antenna element divided into small planar-shaped pieces.

MODES TO IMPLEMENT THE INVENTION

The following explains preferred modes of this invention with reference to the drawings. Additionally, this invention is not limited to the following modes. Among the following structural elements are contained elements that could be easily assumed by those skilled in the art, and substantially identical elements. Furthermore, the following structural elements can be appropriately combined.

Figure 1:
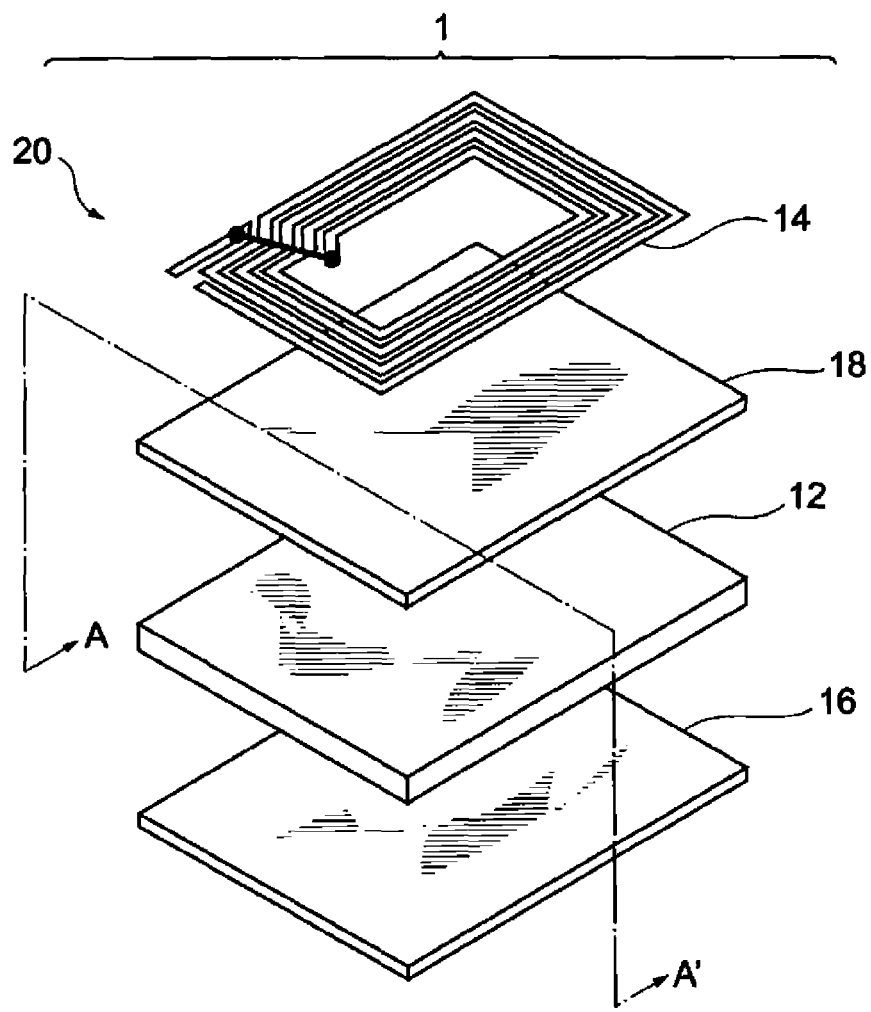
FIG. 1 is a schematic exploded perspective view of an antenna element related to a mode of this invention.

As shown in FIG. 1, an antenna element 1 related to a mode of this invention is provided with an adhesive layer 18, a loop-shaped antenna coil 14, a protective layer 16, and a ferrite plate 12. Furthermore, in FIG. 1, a terminal that connects with the outside, a communication processing circuit, and the like are omitted.

The ferrite plate related to this mode is constituted by a ferrite composition related to this mode. The ferrite composition related to this mode is an NiCuZn ferrite and contains iron oxide, copper oxide, zinc oxide, and nickel oxide as main components.

In 100 mol % of the main components, with $Fe_2O_3$ conversion, the content of iron oxide is 45.0-49.5 mol %, preferably 45.5-48.5 mol %, and more preferably 46.0-48.0 mol %. There is a tendency that if too little iron oxide is contained, the real part μ' of complex magnetic permeability in a high-frequency band deteriorates, and if too much iron oxide is contained, the imaginary part μ" of complex magnetic permeability in a high-frequency band increases. In either case, if it is used as an antenna element, it becomes a factor, which deteriorates a communication distance.

In 100 mol % of the main components, with CuO conversion, the content of copper oxide is 4.0-16.0 mol %, preferably 5.6-14.8 mol %, and more preferably 6.8-12.0 mol %. There is a tendency that if too little copper oxide is contained, the real part μ' of complex magnetic permeability in a high-frequency band decreases, and if too much copper oxide is contained, abnormal growth of particles is generated, and even though the real part μ' of complex magnetic permeability improves, the imaginary part μ" rapidly deteriorates. In either case, if it is used as an antenna element, it becomes a factor that decreases the communication distance.

In 100 mol % of the main components, with ZnO conversion, the content of zinc oxide is 19.0-25.0 mol %, preferably 20.0-24.5 mol %, and more preferably 21.0-24.0 mol %. There is a tendency that if too little zinc oxide is contained, the real part μ' of complex magnetic permeability in a high-frequency band decreases, and if too much zinc oxide is contained, the imaginary part μ" of complex magnetic permeability in a high-frequency band increases. In either case, if it is used as an antenna element, it becomes a factor that decreases the communication distance.

The remaining portion of the main components may be constituted by only nickel oxide or may also contain manganese oxide or the like that is an inevitable impurity. If the remaining portion of the main component contains nickel oxide, in 100 mol % of the main component of a Ni—Cu—Zn ferrite sintered body, with NiO conversion, the content of nickel oxide is 9.5-32.0 mol %, preferably 15.0-30.0 mol %, and more preferably 17.0-28.0 mol %. If the content of nickel oxide is less than 9.5 mol % with NiO conversion, there is a tendency that a resonance frequency of complex magnetic permeability is shifted to a lower frequency side, and the imaginary part μ" of complex magnetic permeability in a high frequency band increases. Meanwhile, if the content of nickel oxide is larger than 32.0 mol % with NiO conversion, there is a tendency that the real part μ' of complex magnetic permeability decreases in not only a high-frequency band, but also a low-frequency band. In either case, if it is used as an antenna element, it becomes a factor that decreases the communication distance.

In addition to the above main components, the ferrite composition related to this mode contains titanium oxide and cobalt oxide as accessory components.

With respect to the main components, with $TiO_2$ conversion, the content of titanium oxide is 0.5-2 weight %, preferably 0.6-1.9 weight %, and more preferably 0.7-1.8 weight %. There is a tendency that if too little titanium oxide is contained, the real μ' part of complex magnetic permeability in a high-frequency band decreases, and if too much titanium oxide is contained, a resonance frequency of the complex magnetic permeability is significantly shifted to a lower frequency side, and as a result, the imaginary part μ" of complex magnetic permeability in a high-frequency band increases. In either case, if it is used as an antenna element, it becomes a factor that decreases the communication distance.

With respect to the main components, with CoO conversion, the content of cobalt oxide is 0.35-2 weight %, preferably 0.4-1.5 weight %, and more preferably 0.5-1 weight %. If too little cobalt oxide is contained, the imaginary part μ" in a high-frequency band rapidly deteriorates. If too much cobalt oxide is contained, the real part μ' in a high-frequency band decreases. Thus, in either case, if it is used as an antenna element, it becomes a factor that decreases the communication distance.

Additionally, when titanium oxide is contained independently, the above effect cannot be sufficiently obtained. That is, the above effect is a combined effect, which can be obtained for the first time only when two types, titanium oxide and cobalt oxide, are contained and the content of titanium oxide and cobalt oxide are further controlled within a scope of this invention.

In the ferrite composition related to this mode, the composition ranges of the main components are controlled within the above ranges. In addition, specific contents of titanium oxide and cobalt oxide, as accessory components, are contained. In particular, by adding titanium oxide, frequency dependency of the imaginary part μ" of the complex magnetic permeability becomes steep, and it is possible to have a low μ" while a high μ' is maintained in RFID or in the vicinity of the 13.56 MHz communication frequency of NFC. When such a ferrite composition is used as an antenna element, the communication distance can be improved.

Next, an example of a method of manufacturing a ferrite plate is explained, which is constituted by a ferrite composition related to this mode.

First, the starting materials (materials of the main components and materials of the accessory components) are weighed so as to be a specified composition ratio, and are mixed such that a material mixture is obtained. As a mixing method, for example, a wet mixing method using a ball mill, and a dry mixing method using a dry process mixer can be listed. Furthermore, it is preferable to use starting materials whose average particle diameters are 0.1-3 μm.

As ingredients of the main components, iron oxide ($\alpha$-$Fe_2O_3$), copper oxide (CuO), zinc oxide (ZnO), nickel oxide (NiO), or composite oxides containing these, or the like can be used. Furthermore, various compounds that become the above oxides, or composite oxides, by calcinating, or the like can be used. As ones that become the above oxides by calcinating, for example, metal simple substances, metal carbonates, oxalates, nitrates, hydroxides, halides, organometal compounds, and the like can be listed.

As ingredients of the accessory components, titanium oxide ($TiO_2$) and cobalt oxide ($Co_3O_4$) can be used. For the cobalt oxide, CoO or cobalt ferrite ($CoFe_2O_4$) can be used, but it is easy to store and handle $Co_3O_4$, and its valence is stable even in the air, and mass productivity is excellent; thus, $Co_3O_4$ is preferable as an ingredient of the cobalt oxide.

Next, the ingredient mixture is preliminarily calcined so as to obtain a preliminary calcined material. Preliminary calcination promotes thermal decomposition of the ingredients, component homogenization, ferrite generation, disappearance of ultrafine particles by calcination, and particle growth to appropriate particle size such that the ingredient mixture is converted to a mode appropriate for the following step. Such preliminary calcination is performed preferably at a temperature of from 800 to 1100° C., and is normally performed for approximately one to three hours. Preliminary calcination can also be performed in the outside atmosphere (air) and can also be performed in an atmosphere in which the oxygen partial pressure is higher than that of the outside atmosphere, or in a pure oxygen atmosphere. Additionally, ingredients of main and accessory components can be mixed before preliminary calcination, and can also be mixed after preliminary calcination.

Next, a preliminary calcined material is crushed into pieces so as to obtain a crushed material. The crushing is performed in order to break the cohesion of the preliminary calcined material and make it into particles having a suitable sinterability. If the preliminary calcined material forms large lumps, after crushing and pulverizing are performed, wet pulverization is performed by using a ball mill, an attriter, or the like. Wet pulverization is performed until the average particle diameter becomes preferably approximately 0.5-2 μm.

A ferrite plate related to this mode is manufactured by using the obtained crushed material. A method of manufacturing the ferrite plate is not limited, but a sheet method is used below.

First, the obtained crushed material is made into a slurry along with additives such as a solvent, a binder, a dispersant, a plasticizer, or the like, and a paste is manufactured. Then, a green sheet is formed, which has a thickness of from 50 to 350 μm, using this paste. Additionally, a plurality of obtained sheets can also be layered. Next, the formed green sheet is processed into a specified shape, and goes through de-binding treatment process and then a calcination process to obtain a ferrite plate, having a thickness of from 30 to 300 μm, related to this mode. The calcination is normally performed for approximately two to five hours preferably at a temperature of from 900 to 1300° C. Additionally, calcination can also be performed in the outside atmosphere (air) and can also be performed in an atmosphere in which the oxygen partial pressure is higher than that of the outside atmosphere. Thus, a ferrite plate related to this mode is obtained.

In the above-mentioned mode, a ferrite plate was manufactured by a sheet method. However, for example, after ferrite particles and a binder resin are mixed, a ferrite plate can also be manufactured by a known method such as a particle compression molding method, an injection molding method, a calendaring method, an extruding method, or the like.

Figure 2:
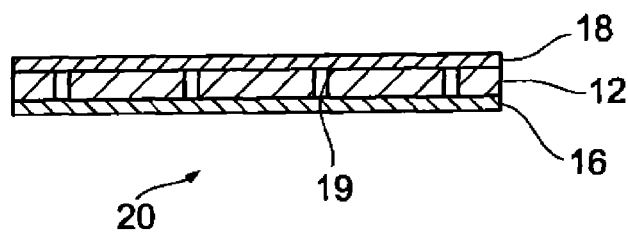
FIG. 2 is a partial cross-sectional view of a member for an antenna element, which is divided into many small planar-shaped pieces held by an adhesive layer and a protective layer.

Next, on one side (one surface) of the obtained ferrite plate, an adhesive layer 18, for example, a double-sided adhesive tape is arranged. Then, on a surface (the other surface) opposite to the surface on which the adhesive layer is formed, a protective layer 16 is arranged so as to suppress the ferrite plate from falling off. The protective layer can be formed by adhering a film or a sheet of a resin constituting the protective layer to a surface of the sintered ferrite plate via an adhesive as needed or by coating paint containing a resin constituting the protective layer on the surface of the sintered ferrite plate. While both surfaces of the ferrite plate are held by these two layers (adhesive layer 18 and protective layer 16), by passing them through a roller of a rolling device, once in a zero-degree direction and once in a 90-degree direction, the ferrite plate is divided into a plurality of surface-shaped pieces in a grid shape, and gaps 19 are generated (see FIG. 2). Thus, a member for an antenna element related to this mode is obtained, which is bendable and flexible.

Next, an antenna coil 14 for non-contact communication is pasted to a surface of the obtained adhesive layer 18 of a member 20 for an antenna element. The antenna coil 14 has a loop antenna structure provided with an open portion in the center, and the loop shape may be round, substantially rectangular, or polygonal. Furthermore, a material of the antenna coil 14 can be appropriately selected from among a conductive metal wire, a metal plate material, a metal foil material, a metal cylindrical material, or the like. For example, the antenna coil 14 can be formed by a metal wire, metal foil, a conductive body paste, plating transfer, sputtering, deposition, or screen printing. Thus, the antenna element 1 related to this mode is obtained.

Modes of this invention were explained above, but this invention is not limited to any of these modes. Of course, it can be implemented in various modes within the scope of the claims of this invention.

[Embodiments]

The following explains this invention based on more detailed embodiments, but this invention is not limited to these embodiments.

First, $Fe_2O_3$, NiO, CuO, and ZnO were prepared as ingredients of main components, and $TiO_2$ and $Co_3O_4$ were prepared as ingredients of accessory components. They were weighed so as to be the specified combination shown in Table 1. 500 mL of ion exchange water was added to this as a solvent, and the resultant was mixed by a steel ball mill for 16 hours so as to obtain an ingredient mixture.

After the obtained ingredient mixture was preliminarily calcinated at a maximum temperature of 800° C. for two hours using a heating furnace, it was furnace-cooled so as to obtain a preliminary calcinated material. After the preliminary calcinated material was crushed by a 30 mesh sieve, 500 mL of ion exchange water was again added as a solvent, and wet pulverization was performed by a steel ball mill for 16 hours so as to obtain a crushed material.

3.5% by weight of dioctyl adipate, 8% by weight of butyral resin, and 72% by weight of mixed solution of xylene and isobutyl alcohol (xylene:isobutyl alcohol=6:4 (weight ratio)) as a solvent were mixed by a ball mill with 100% by weight of ferrite particles of the obtained crushed material, dissolved, and dispersed so as to obtain a mixture (paste). After the mixture was evacuated and degassed by an oil rotary vacuum pump, the obtained mixture was coated onto a polyethylene terephthalate (PET) film by a doctor blade at a uniform thickness and was dried by hot air at 100° C. for 30 minutes so as to obtain a green sheet with a thickness of 120 μm.

Next, the temperature of the obtained green sheet was increased from room temperature to 500° C. at a temperature increase speed of 1° C./minute. After holding the obtained green sheet at 500° C. for three hours and removing grease from it, it was heated up to 1000° C. and sintered for two hours, and a ferrite plate with a thickness of approximately 100 μm was obtained.

On one surface of the obtained ferrite plate, a commercially available acrylic double-sided tape (30 μm) was pasted as an adhesive layer, and on another surface, a one-sided adhesive sheet (30 μm) coated with a commercially available acrylic adhesive was pasted as a protective layer. The ferrite plate that was held by the adhesive layer and the protective layer was inserted through rollers of a rolling device whose GAP amount was adjusted to 150 μm, once in a zero-degree direction and once in a 90-degree direction, so as to obtain a member for an antenna element in which the ferrite plate was divided into many surface-shaped pieces in a grid shape.

The one-sided adhesive sheet of the member for an antenna element was exfoliated, and upon checking the divided shape and size of the ferrite plate, it was divided into a 2-3 mm grid shape.

<Magnetic Characteristic Evaluation>

As for the complex magnetic permeability, a toroidal shape was punched, using a pinnacle die in which an outer diameter was 18 mm and an inner diameter was 10 mm, from a member for an antenna element with a thickness of 160 μm divided into many surface-shaped pieces (the thickness of the ferrite plate was 100 μm), and using six punched members for an antenna element that were pasted to each other, by using (i) an impedance analyzer (manufactured by Agilent Technologies, product name: RF Impedance/Material Analyzer, model: E4991A) and (ii) a magnetic material measurement electrode (manufactured by Agilent Technologies, product name: Magnetic Material Test Fixture, model: 16454A), a magnetic characteristic was evaluated at a measurement temperature of 25° C.

<Antenna Communication Distance>

A rectangular shape with a dimension of 50 mm×40 mm was punched out by a pinnacle die from a member for an antenna element with a thickness of 160 μm divided into many surface-shaped pieces (the thickness of the ferrite plate was 100 μm) so as to make a sample for communication distance measurement. On the surface of the member for an antenna element having a protective layer, a copper-plate was arranged, which is provided with metal having a casing cell, a battery pack, or the like, and an antenna coil (loop antenna structure, pattern: substantially rectangular) for an NFC system having a dimension of 50 mm×40 mm was pasted to the surface having the adhesive layer, and this was used as a measurement tag. An antenna module was constituted between the tag and an NFC reader writer (manufactured by ID Tech, product name: contactless reader, model: ViVOpay 5000), and a communication distance at 25° C. was measured at a resonance frequency of 13.56 MHz.

Table 1 shows the obtained measurement evaluation result. IBF10 (series name: manufactured by TDK) was listed as a reference example of a Ni—Cu—Zn ferrite sintered body. In this embodiment, it is desirable that the communication distance is the same as or better than that of IBF10 (50.0 mm or higher). It is further desirable that μ' is 165 or higher and that μ" is 7 or lower.

TABLE 1

| Sample No. | Composition | | | | | | Material Characteristic Complex Magnetic Permeability | | Antenna Characteristic Communication Distance [mm] |
|---|---|---|---|---|---|---|---|---|---|
| | Main Component [mol %] | | | | Accessory Component [weight %] | | Real Part μ' | Imaginary Part μ" | |
| | $Fe_2O_3$ | NiO | CuO | ZnO | $TiO_2$ | CoO | at 13.56 MHz | | |
| Reference Example | IBF10 | | | | | | 100 | 4.0 | 50.0 |
| Comparative Example 1 | 48.0 | 19.6 | 9.2 | 23.2 | 1.40 | 0.00 | 184 | 73.0 | 42.2 |
| Embodiment 1 | 48.0 | 19.6 | 9.2 | 23.2 | 1.40 | 0.35 | 243 | 6.9 | 52.1 |
| Embodiment 2 | 48.0 | 19.6 | 9.2 | 23.2 | 1.40 | 0.40 | 240 | 5.2 | 52.8 |
| Embodiment 3 | 48.0 | 19.6 | 9.2 | 23.2 | 1.40 | 0.50 | 235 | 4.3 | 53.0 |
| Embodiment 4 | 48.0 | 19.6 | 9.2 | 23.2 | 1.40 | 1.00 | 201 | 2.1 | 53.9 |
| Embodiment 5 | 48.0 | 19.6 | 9.2 | 23.2 | 1.40 | 1.50 | 166 | 2.4 | 51.6 |
| Embodiment 6 | 48.0 | 19.6 | 9.2 | 23.2 | 1.40 | 2.00 | 165 | 2.1 | 51.4 |
| Comparative Example 2 | 48.0 | 19.6 | 9.2 | 23.2 | 1.40 | 2.50 | 87 | 4.0 | 48.0 |
| Comparative Example 3 | 48.0 | 19.6 | 9.2 | 23.2 | 0.00 | 0.60 | 94 | 4.2 | 49.3 |
| Embodiment 7 | 48.0 | 19.6 | 9.2 | 23.2 | 0.50 | 0.60 | 172 | 3.1 | 51.5 |
| Embodiment 8 | 48.0 | 19.6 | 9.2 | 23.2 | 0.80 | 0.60 | 183 | 3.3 | 51.8 |
| Embodiment 9 | 48.0 | 19.6 | 9.2 | 23.2 | 1.20 | 0.60 | 210 | 3.1 | 52.8 |
| Embodiment 10 | 48.0 | 19.6 | 9.2 | 23.2 | 1.80 | 0.60 | 230 | 4.2 | 52.9 |
| Embodiment 11 | 48.0 | 19.6 | 9.2 | 23.2 | 1.90 | 0.60 | 232 | 4.8 | 52.7 |
| Embodiment 12 | 48.0 | 19.6 | 9.2 | 23.2 | 2.00 | 0.60 | 230 | 4.9 | 52.7 |
| Comparative Example 4 | 48.0 | 19.6 | 9.2 | 23.2 | 2.20 | 0.60 | 261 | 60.6 | 48.6 |
| Comparative Example 5 | 44.0 | 23.6 | 9.2 | 23.2 | 1.40 | 0.60 | 98 | 4.0 | 49.3 |
| Embodiment 13 | 45.0 | 22.6 | 9.2 | 23.2 | 1.40 | 0.60 | 165 | 2.3 | 51.5 |
| Embodiment 14 | 45.5 | 22.1 | 9.2 | 23.2 | 1.40 | 0.60 | 171 | 2.7 | 51.7 |
| Embodiment 15 | 46.0 | 21.6 | 9.2 | 23.2 | 1.40 | 0.60 | 215 | 3.1 | 52.9 |
| Embodiment 16 | 48.0 | 19.6 | 9.2 | 23.2 | 1.40 | 0.60 | 229 | 4.2 | 52.9 |
| Embodiment 17 | 48.5 | 19.1 | 9.2 | 23.2 | 1.40 | 0.60 | 236 | 5.0 | 52.8 |
| Embodiment 18 | 49.5 | 18.1 | 9.2 | 23.2 | 1.40 | 0.60 | 220 | 4.0 | 52.7 |
| Comparative Example 6 | 51.0 | 16.6 | 9.2 | 23.2 | 1.40 | 0.60 | 164 | 49.7 | 43.3 |
| Comparative Example 7 | 48.0 | 26.8 | 2.0 | 23.2 | 1.40 | 0.60 | 93 | 3.5 | 49.4 |
| Embodiment 19 | 48.0 | 24.8 | 4.0 | 23.2 | 1.40 | 0.60 | 170 | 2.0 | 52.0 |

TABLE 1-continued

| Sample No. | Composition Main Component [mol %] | | | | Accessory Component [weight %] | | Material Characteristic Complex Magnetic Permeability Real Part $\mu'$ | Imaginary Part $\mu''$ | Antenna Characteristic Communication Distance [mm] |
|---|---|---|---|---|---|---|---|---|---|
| | $Fe_2O_3$ | NiO | CuO | ZnO | $TiO_2$ | CoO | at 13.56 MHz | | |
| Embodiment 20 | 48.0 | 23.2 | 5.6 | 23.2 | 1.40 | 0.60 | 182 | 2.7 | 52.0 |
| Embodiment 21 | 48.0 | 22.0 | 6.8 | 23.2 | 1.40 | 0.60 | 225 | 3.2 | 53.1 |
| Embodiment 22 | 48.0 | 16.8 | 12.0 | 23.2 | 1.40 | 0.60 | 231 | 4.2 | 52.9 |
| Embodiment 23 | 48.0 | 14.0 | 14.8 | 23.2 | 1.40 | 0.60 | 232 | 4.5 | 52.8 |
| Embodiment 24 | 48.0 | 12.8 | 16.0 | 23.2 | 1.40 | 0.60 | 232 | 4.8 | 52.7 |
| Comparative Example 8 | 48.0 | 10.8 | 18.0 | 23.2 | 1.40 | 0.60 | 252 | 54.3 | 48.8 |
| Comparative Example 9 | 48.0 | 24.8 | 9.2 | 18.0 | 1.40 | 0.60 | 97 | 4.7 | 49.3 |
| Embodiment 25 | 48.0 | 23.8 | 9.2 | 19.0 | 1.40 | 0.60 | 168 | 3.0 | 51.5 |
| Embodiment 26 | 48.0 | 22.8 | 9.2 | 20.0 | 1.40 | 0.60 | 173 | 2.2 | 52.4 |
| Embodiment 27 | 48.0 | 21.8 | 9.2 | 21.0 | 1.40 | 0.60 | 202 | 2.2 | 53.6 |
| Embodiment 28 | 48.0 | 18.8 | 9.2 | 24.0 | 1.40 | 0.60 | 234 | 4.3 | 53.0 |
| Embodiment 29 | 48.0 | 18.3 | 9.2 | 24.5 | 1.40 | 0.60 | 236 | 4.9 | 52.8 |
| Embodiment 30 | 48.0 | 17.8 | 9.2 | 25.0 | 1.40 | 0.60 | 238 | 4.9 | 52.8 |
| Comparative Example 10 | 48.0 | 16.8 | 9.2 | 26.0 | 1.40 | 0.60 | 268 | 86.0 | 46.8 |
| Embodiment 31 | 49.3 | 10.1 | 15.8 | 24.8 | 1.90 | 1.90 | 159 | 1.8 | 52.7 |
| Embodiment 32 | 49.3 | 10.1 | 15.8 | 24.8 | 0.52 | 1.90 | 116 | 1.5 | 52.6 |
| Embodiment 33 | 49.3 | 10.1 | 15.8 | 24.8 | 1.90 | 0.38 | 240 | 7.2 | 51.9 |
| Embodiment 34 | 49.3 | 10.1 | 15.8 | 24.8 | 0.52 | 0.38 | 192 | 5.3 | 50.4 |
| Embodiment 35 | 45.2 | 31.4 | 4.2 | 19.2 | 0.52 | 0.38 | 122 | 1.9 | 50.5 |
| Embodiment 36 | 45.2 | 31.4 | 4.2 | 19.2 | 0.52 | 1.90 | 101 | 1.2 | 52.4 |
| Embodiment 37 | 45.2 | 31.4 | 4.2 | 19.2 | 1.90 | 0.38 | 196 | 7.2 | 50.1 |
| Embodiment 38 | 45.2 | 31.4 | 4.2 | 19.2 | 1.90 | 1.90 | 126 | 2.4 | 50.3 |
| Comparative Example 11 | 48.7 | 19.3 | 11.1 | 21.0 | 0.00 | 0.40 | 160 | 2.0 | 49.8 |
| Comparative Example 12 | 49.0 | 13.5 | 10.0 | 25.5 | 0.00 | 0.60 | 210 | 16.7 | 49.3 |
| Comparative Example 13 | 48.0 | 22.0 | 10.0 | 20.0 | 0.00 | 0.00 | 184 | 73.1 | 40.0 |

It was confirmed that if two types of accessory components, $TiO_2$ and CoO, of Table 1 are contained and the content is within a scope of this invention (embodiments 1-38), while a high $\mu'$ is being maintained, it is possible to have a low $\mu''$, and a preferable communication distance can be obtained. Meanwhile, it was confirmed that if two types of accessory components, $TiO_2$ and CoO are both not contained (comparative example 13), $\mu''$ increases, and the communication distance decreases. Furthermore, it was confirmed that if only one type is contained (comparative examples 1, 3, 11, 12), $\mu'$ decreases or $\mu''$ increases, and the communication distance decreases. In particular, from FIG. 3, which shows the complex magnetic permeability frequency characteristics of embodiment 9 and comparative example 12, in which the same $\mu'$ is obtained, it can be confirmed that the $\mu''$ profile of embodiment 9 having $TiO_2$ is more steep.

Furthermore, it was confirmed that if any of the content of $Fe_2O_3$, CuO, and ZnO is not within a scope of this invention (comparative examples 5-10), $\mu'$ decreases or $\mu''$ increases and the communication distance decreases.

Based on these results, it was confirmed that compared to the comparative examples and the reference example, the ferrite composition of the embodiments of this invention shows excellence in high $\mu'$ and low $\mu''$, and the communication distance significantly improves by applying the ferrite composition for an antenna element.

INDUSTRIAL USE OF THE INVENTION

Thus, it was confirmed that by applying the ferrite composition related to this invention to a member for an antenna element, the communication distance can significantly improve. Additionally, while maintaining a constant communication distance, a thickness of an antenna can be made thin. Thus, this is also useful in terms of space reduction.

EXPLANATION OF THE SYMBOLS

1 Antenna element
12 Ferrite plate
14 Antenna coil
16 Protective layer
18 Adhesive layer
19 Gap
20 Member for an antenna element

The invention claimed is:

1. A ferrite composition comprising:
   iron oxide ($Fe_2O_3$) in a range from 45.0 to 49.5 mol %;
   nickel oxide (NiO) in a range from 9.5 to 32.0 mol %;
   copper oxide (CuO) in a range from 4.0 to 16.0 mol %;
   zinc oxide (ZnO) in a range from 19.0 to 25.0 mol %;
   titanium oxide ($TiO_2$) in a range from 0.8 to 2.0 weight %; and
   cobalt oxide (CoO) in a range from 0.35 to 2.0 weight %.

2. A ferrite plate formed of the ferrite composition of claim 1.

3. A magnetic member for an antenna element comprising:
   the ferrite plate of claim 2;
   an adhesive layer arranged on a first surface of the ferrite plate; and
   a protective layer arranged on a second surface of the ferrite plate that is opposite to the first surface,
   wherein the ferrite plate is divided into pieces in a grid shape between the adhesive and protective layers.

4. An antenna element comprising:
the magnetic member of claim 3; and
an antenna coil disposed on a surface of the adhesive layer.

5. The antenna element of claim 4, having a communication distance of 50.0 mm or higher.

6. The ferrite composition of claim 1, wherein:
iron oxide ($Fe_2O_3$) is in a range from 45.5 to 48.5 mol %;
nickel oxide (NiO) is in a range from 15.0 to 30.0 mol %;
copper oxide (CuO) is in a range from 5.6 to 14.8 mol %;
zinc oxide (ZnO) is in a range from 20.0 to 24.5 mol %;
titanium oxide ($TiO_2$) is in a range from 0.8 to 1.9 weight %; and
cobalt oxide (CoO) is in a range from 0.4 to 1.5 weight %.

7. The ferrite composition of claim 1, wherein:
iron oxide ($Fe_2O_3$) is in a range from 46.0 to 48.0 mol %;
nickel oxide (NiO) is in a range from 17.0 to 28.0 mol %;
copper oxide (CuO) is in a range from 6.8 to 12.0 mol %;
zinc oxide (ZnO) is in a range from 21.0 to 24.0 mol %;
titanium oxide ($TiO_2$) is in a range from 0.8 to 1.8 weight %; and
cobalt oxide (CoO) is in a range from 0.5 to 1.0 weight %.

8. The ferrite composition of claim 1, having $\mu'$ that is 165 or higher and $\mu'$ that is 7 or lower.

9. A ferrite composition comprising:
iron oxide ($Fe_2O_3$) in a range from 45.0 to 49.5 mol %;
nickel oxide (NiO) in a range from 9.5 to 32.0 mol %;
copper oxide (CuO) in a range from 4.0 to 16.0 mol %;
zinc oxide (ZnO) in a range from 19.0 to 25.0 mol %;
titanium oxide ($TiO_2$) in a range from 0.5 to 2.0 weight %; and
cobalt oxide (CoO) in a range from 1.0 to 2.0 weight %.

10. The ferrite composition of claim 9, wherein:
iron oxide ($Fe_2O_3$) is in a range from 45.5 to 48.5 mol %;
nickel oxide (NiO) is in a range from 15.0 to 30.0 mol %;
copper oxide (CuO) is in a range from 5.6 to 14.8 mol %;
zinc oxide (ZnO) is in a range from 20.0 to 24.5 mol %;
titanium oxide ($TiO_2$) is in a range from 0.6 to 1.9 weight %; and
cobalt oxide (CoO) is in a range from 1.0 to 1.5 weight %.

11. The ferrite composition of claim 9, wherein:
iron oxide ($Fe_2O_3$) is in a range from 46.0 to 48.0 mol %;
nickel oxide (NiO) is in a range from 17.0 to 28.0 mol %;
copper oxide (CuO) is in a range from 6.8 to 12.0 mol %;
zinc oxide (ZnO) is in a range from 21.0 to 24.0 mol %;
titanium oxide ($TiO_2$) is in a range from 0.7 to 1.8 weight %; and
cobalt oxide (CoO) is in a range from 1.0 to 1.5 weight %.

12. The ferrite composition of claim 9, having $\mu'$ that is 165 or higher and $\mu''$ that is 7 or lower.

13. A ferrite plate formed of the ferrite composition of claim 9.

14. A magnetic member for an antenna element comprising:
the ferrite plate of claim 13;
an adhesive layer arranged on a first surface of the ferrite plate; and
a protective layer arranged on a second surface of the ferrite plate that is opposite to the first surface,
wherein the ferrite plate is divided into pieces in a grid shape between the adhesive and protective layers.

15. An antenna element comprising:
the magnetic member of claim 14; and
an antenna coil disposed on a surface of the adhesive layer.

16. The antenna element of claim 15, having a communication distance of 50.0 mm or higher.

* * * * *